(12) United States Patent
Lee et al.

(10) Patent No.: US 10,017,839 B2
(45) Date of Patent: Jul. 10, 2018

(54) METHOD FOR LEACHING VALUABLE METALS CONTAINED IN WASTE DENITRIFICATION CATALYST BY USING ROASTING AND WATER LEACHING

(71) Applicant: KOREA INSTITUTE OF GEOSCIENCE AND MINERAL RESOURCES, Daejeon (KR)

(72) Inventors: Jin-Young Lee, Daejeon (KR); Joon-Soo Kim, Daejeon (KR); Rajesh Kumar, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 589 days.

(21) Appl. No.: 14/425,129

(22) PCT Filed: Jan. 18, 2013

(86) PCT No.: PCT/KR2013/000421
§ 371 (c)(1),
(2) Date: Mar. 2, 2015

(87) PCT Pub. No.: WO2014/038762
PCT Pub. Date: Mar. 13, 2014

(65) Prior Publication Data
US 2015/0203938 A1    Jul. 23, 2015

(30) Foreign Application Priority Data
Sep. 7, 2012 (KR) .................. 10-2012-0099496

(51) Int. Cl.
*C22B 34/36* (2006.01)
*C22B 1/00* (2006.01)
(Continued)

(52) U.S. Cl.
CPC ............ *C22B 34/365* (2013.01); *C22B 1/005* (2013.01); *C22B 3/22* (2013.01); *C22B 7/009* (2013.01);
(Continued)

(58) Field of Classification Search
USPC .......................................................... 423/53
See application file for complete search history.

(56) References Cited

FOREIGN PATENT DOCUMENTS

| CN | 101921916 A | 12/2010 |
|----|-------------|---------|
| JP | 11172343 A  | 6/1999  |

(Continued)

OTHER PUBLICATIONS

Extended European Search Report dated Oct. 21, 2015 corresponding to Application No. 13834863.6.
(Continued)

*Primary Examiner* — Melissa S Swain
(74) *Attorney, Agent, or Firm* — Hauptman Ham, LLP (57) ABSTRACT

Disclosed is a method for effectively leaching valuable metals such as vanadium and tungsten contained in a waste denitrification catalyst by using roasting and water leaching. According to the present invention, the method for leaching valuable metals contained in a waste denitrification catalyst comprises the steps of: (a) mixing a waste denitrification catalyst containing vanadium (V) and tungsten (W) in the form of an oxide with an alkali metal compound to form a mixture; (b) roasting the mixture to generate a roasting product comprising sodium vanadate ($NaVO_3$) and sodium tungstate ($Na_2WO_4$); and (c) injecting the roasting product into water to water leach sodium vanadate and sodium tungstate in the form of a vanadate ion ($VO_3^-$) and a tungstate ion ($WO_4^{2-}$).

14 Claims, 8 Drawing Sheets

(51) Int. Cl.
      *C22B 7/00*           (2006.01)
      *C22B 34/22*         (2006.01)
      *C22B 3/22*          (2006.01)

(52) U.S. Cl.
      CPC ........... C22B 34/225 (2013.01); *Y02P 10/214* (2015.11); *Y02P 10/23* (2015.11); *Y02P 10/234* (2015.11)

(56) References Cited

FOREIGN PATENT DOCUMENTS

| | | | |
|---|---|---|---|
| JP | 2000309828 | A | 11/2000 |
| JP | 2001316732 | A | 11/2001 |
| JP | 2009114545 | A | 5/2009 |
| KR | 1020010107450 | A | 12/2001 |
| KR | 1020040067396 | A | 7/2004 |
| KR | 1020070033122 | A | 3/2007 |
| WO | 2007020338 | A2 | 2/2007 |

OTHER PUBLICATIONS

International Search Report for PCT/KR2013/000421, dated Jun. 10, 2013.

Office Action dated Jun. 14, 2016 from European Patent Office in connection with the counterpart European patent pplication No. 13 834 863.6.

Database WPI; Thomson Scientific, London, GB; AN 2011-B08820 XP002745327, total 2 pages.

METHOD FOR LEACHING VALUABLE METALS CONTAINED IN WASTE DENITRIFICATION CATALYST BY USING ROASTING AND WATER LEACHING

TECHNICAL FIELD

The present invention relates to a method for leaching valuable metals from a waste denitrification catalyst, and, more particularly, to a method for leaching valuable metals such as vanadium (V) and tungsten (W) from a waste denitrification catalyst in an eco-friendly and economical manner.

BACKGROUND ART

An exhaust apparatus in a power plant and the like contains a selective catalytic reduction (SCR) catalyst which effectively removes nitrogen oxide ($NO_x$). Typically, such a selective catalytic reduction catalyst is used for three to four years and recycled twice to three times. Thereafter, the catalyst is discarded in the form of a waste denitrification catalyst.

A waste denitrification catalyst contains valuable metals, such as vanadium (V) and tungsten (W), in the form of oxides. Generally, in the waste denitrification catalyst, vanadium oxide ($V_2O_5$) is present in an amount of about 1% by weight (wt %) to about 3 wt %, and tungsten oxide $WO_3$ is present in an amount of about 7 wt % to about 10 wt %.

Thus, if a waste denitrification catalyst is discarded without additional use, this results in not only a burden of waste disposal costs but also loss of valuable natural resources.

However, until now, there have been few studies on recovery of valuable metals from a waste denitrification catalyst and thus such a waste denitrification catalyst has, traditionally, simply been abandoned. Therefore, there is a need for a method of recovering valuable metals from a waste denitrification catalyst.

Korean Patent Publication No. 10-2004-0067396 A (publication date: Jul. 30, 2004) discloses a method wherein a waste denitrification catalyst is treated to be used as a photocatalyst based on the fact that a large amount of titanium oxide is contained in the waste denitrification catalyst.

DISCLOSURE

Technical Problem

It is an aspect of the present invention to provide a method for leaching valuable metals, such as vanadium (V) and tungsten (W), from a waste denitrification catalyst in an efficient manner.

Technical Solution

In accordance with one embodiment of the present invention, a method for leaching valuable metals from a waste denitrification catalyst includes: (a) mixing a waste denitrification catalyst containing vanadium (V) and tungsten (W) in the form of oxides with an alkali metal compound to form a mixture; (b) roasting the mixture to produce a roasted product containing sodium vanadate ($NaVO_3$) and sodium tungstate ($Na_2WO_4$); and (c) introducing the roasted product into water to water leach sodium vanadate and sodium tungstate in the form of a vanadate ion ($VO_3^-$) and a tungstate ion ($WO_4^{2-}$).

The alkali metal compound may include sodium carbonate ($Na_2CO_3$) or sodium hydroxide (NaOH).

In step (a), the alkali metal compound is preferably mixed in an amount of 5 wt % to 40 wt % based on 100 wt % of the waste denitrification catalyst, more preferably in an amount of 15 wt % to 30 wt % based on 100 wt % of the waste denitrification catalyst.

Step (b) may be performed at 800° C. to 900° C.

The method may further include, after step (b), ball milling the roasted product to reduce a particle size of the roasted product.

In step (c), the roasted product may be introduced in an amount of 10 wt % to 30 wt % based on 100 wt % of water.

Step (c) may be performed at 40° C. to 60° C.

The method may further include (d) filtering a leachate containing the vanadate ion and the tungstate ion.

In accordance with another embodiment of the present invention, a method for leaching valuable metals from a waste denitrification catalyst includes: (a) mixing a waste denitrification catalyst containing valuable metals with an alkali metal compound to form a mixture; (b) roasting the mixture to produce a roasted product; and (c) water leaching the valuable metals from the roasted product.

Advantageous Effects

The method for leaching valuable metals from a waste denitrification catalyst according to the present invention can efficiently leach valuable metals, such as vanadium (V), tungsten (W), and the like, contained in a waste denitrification catalyst in an eco-friendly and economical manner by roasting at high temperature and water leaching.

BEST MODE

The above and other aspects, features, and advantages of the present invention will become apparent from the detailed description of the following embodiments in conjunction with the accompanying drawings.

It should be understood that the present invention is not limited to the following embodiments and may be embodied in different ways, and that the embodiments are provided for complete disclosure and thorough understanding of the present invention by those skilled in the art. The scope of the present invention is defined only by the claims.

Hereinafter, a method for leaching valuable metals from a waste denitrification catalyst using roasting and water leaching according to the present invention will be described in detail.

Figure 1:
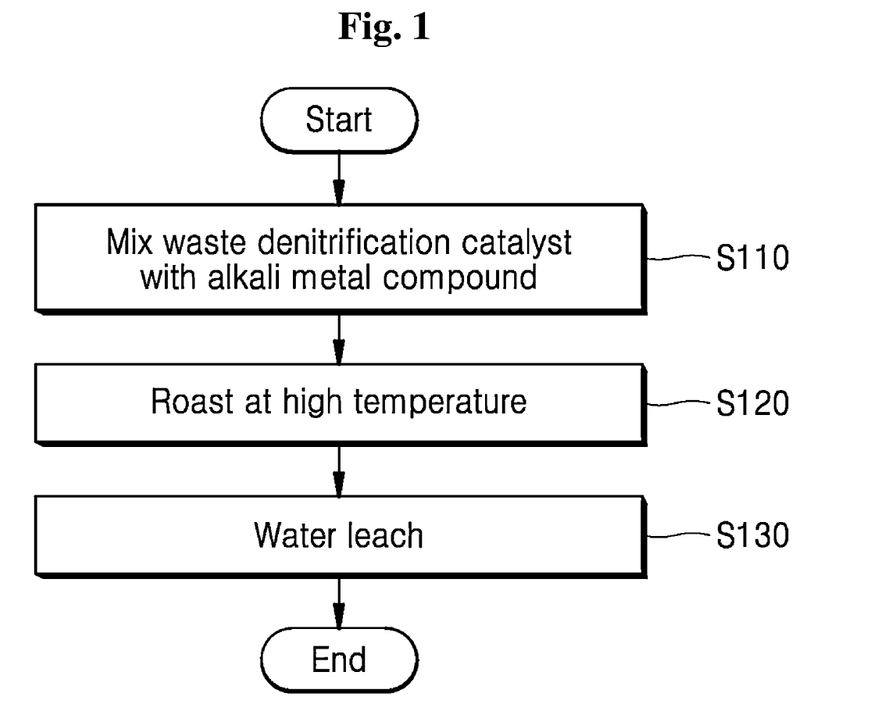
FIG. 1 is a schematic flowchart showing a method for leaching valuable metals from a waste denitrification catalyst according to one embodiment of the present invention.

FIG. 1 is a schematic flowchart showing a method for leaching valuable metals contained in waste denitrification catalysts according to one embodiment of the present invention.

Referring to FIG. 1, the method for leaching valuable metals includes mixing a waste denitrification catalyst with an alkali metal compound (S110), roasting (S120), and water leaching (S130).

First, in mixing the waste denitrification catalyst with the alkali metal compound (S110), the waste denitrification catalyst containing valuable metals is mixed with the alkali metal compound to form a mixture. More specifically, the waste denitrification catalyst containing vanadium (V) and tungsten (W) in the form of an oxide ($V_2O_5$, $WO_3$) is mixed with the alkali metal compound to form a mixture.

Vanadium (V) and tungsten (W) have very low solubility in water and are present in the form of vanadium oxide ($V_2O_5$) and tungsten oxide ($WO_3$), which are difficult to water leach. Thus, it is desirable that vanadium and tungsten be in the form of an alkali metal salt, such as a sodium salt, having high solubility in water to facilitate water leaching.

For this reason, in this operation, the waste denitrification catalyst is mixed with the alkali metal compound, whereby sodium vanadate ($NaVO_3$) and sodium tungstate ($Na_2WO_4$) having relatively high solubility in water can be formed by roasting at high temperature.

Here, as the alkali metal compound, sodium carbonate ($Na_2CO_3$) or sodium hydroxide (NaOH) may be used in terms of reaction rate, although various alkali metal compounds may be used.

In addition, experimental results show that mixing the alkali metal compound in an amount of 5 wt % to 40 wt % based on 100 wt % of the waste denitrification catalyst is advantageous in terms of leaching rate, and mixing the alkali metal compound in an amount of 15 wt % to 30 wt % based on 100 wt % of the waste denitrification catalyst is more advantageous in terms of securing high leaching rate of both vanadium and tungsten.

Next, in roasting (S120), the mixture of the waste denitrification catalyst and the alkali metal compound is subject to roasting at high temperature, thereby producing a roasted product, more particularly, a roasted product containing sodium vanadate ($NaVO_3$) and sodium tungstate ($Na_2WO_4$) having high solubility in water.

In roasting using sodium carbonate and sodium hydroxide, vanadium oxide and tungsten oxide react as follows:

$$V_2O_5(s)+Na_2CO_3(s)=2NaVO_3(s)+CO_2(g) \quad (1)$$

$$WO_3(s)+Na_2CO_3(s)=Na_2WO_4(s)+CO_2(g) \quad (2)$$

$$V_2O_5(s)+2NaOH=2NaVO_3+H_2O(g) \quad (3)$$

$$WO3(s)+2NaOH=Na_2WO_4+H_2O(g) \quad (4)$$

Roasting may be performed at 800° C. to 900° C. If roasting is performed at a temperature of less than 800° C., there is a possibility of insufficient roasting. If roasting is performed at a temperature of higher than 900° C., this can reduce leaching rate of valuable metals without enhancing roasting, depending upon kind of the alkali metal compound.

The method may further include ball milling the roasted product to reduce a particle size of the roasted product. According to experimental results, as the roasted product was reduced in particle size, i.e. average particle diameter, the roasted product was increased in surface area, which led to higher leaching rate.

Next, the roasted product is introduced into water to leach valuable metals from the roasted product. More specifically, the roasted product is introduced into water, thereby leaching sodium vanadate and sodium tungstate in the form of vanadate ions ($VO_3^-$) and tungstate ions ($WO_4^{2-}$).

Water leaching reactions of sodium vanadate and sodium tungstate may be represented as follows, respectively:

$$NaVO_3+H_2O \rightarrow Na^++VO_3^-+H_2O$$

$$Na_2WO_4+H_2O \rightarrow 2Na^++WO_4^{2-}+H_2O$$

In water leaching, the roasted product may be introduced in an amount of 10 wt % to 30 wt % based on 100 wt % of water. If the amount of the roasted product is less than 10 wt %, leached valuable metals can be too small. On the contrary, if the amount of the roasted product is higher than 30 wt %, there is a possibility of deterioration in overall leaching efficiency of valuable metals due to inability to further enhance leaching.

Water leaching may be performed at 40° C. to 60° C. If water leaching is performed at a temperature of less than 40° C., there is a possibility of reduction in water leaching rate, and if water leaching is performed at a temperature of higher than 60° C., there is a possibility of deterioration in stability of a leachate.

The method may further include, after water leaching, filtering a leachate containing the vanadate ions and the tungstate ions to remove unnecessary impurities.

EXAMPLE

Hereinafter, the present invention will be described in more detail with reference to a preferred example. It should be understood that these examples are not to be construed in any way as limiting the present invention.

A description of details apparent to those skilled in the art will be omitted.

1. Preparation of Sample

A waste denitrification catalyst used in Example was obtained from Samcheon Thermal Power Generation Center (Korea) and was subjected to coarse crushing and fine crushing.

Thereafter, component analysis was performed on the waste denitrification catalyst, thereby obtaining results as listed in Table 1.

TABLE 1

| Comp. | $Al_2O_3$ | $WO_3$ | $V_2O_5$ | CaO | MgO | $SiO_2$ | $WO_3$ | $Fe_2O_3$ | $TiO_2$ |
|---|---|---|---|---|---|---|---|---|---|
| Wt % | 5.57 | 7.73 | 1.23 | 2.45 | 0.55 | 9.80 | 0.10 | 0.77 | Remainder |

As shown in Table 1, tungsten and vanadium, as valuable metals to be recovered, were present in an amount of about 7.7 wt % and about 1.2 wt %, respectively, in terms of oxide thereof; a main component was $TiO_2$ present in an amount of 70 wt % or more; and CaO, $Al_2O_3$, MgO, and the like, as binders, were present in a small amount.

2. Experimental Method

In Example, in order to leach valuable metals from a waste denitrification catalyst, mixing a waste denitrification catalyst with an alkali metal compound, roasting at high temperature, and water leaching were performed, under varying conditions.

Here, in roasting at high temperature, amount of the alkali metal compound, roasting temperature, and particle size of waste catalyst particles were set as parameters.

Roasting at high temperature was performed using a muffle furnace (HM-1204, Hanmi High Tech Co., Ltd.), and water leaching after roasting at high temperature was performed using a leaching bath manufactured in house.

After soda roasting, valuable metals in a leachate were analyzed using an ICP-AES (iCAP6300 DUO, ThermoElectron Corp.), thereby calculating leaching rate.

3. Experimental Result

(1) Effect of Amount of Alkali Metal Compound

In order to investigate roasting properties of the waste denitrification catalyst according to changes in amount of the alkali metal compound (NaOH, $NaCO_3$), a roasting experiment was conducted while changing the amount of the alkali metal compound from 2.5 wt % to 40 wt % based on 100 wt % of the waste denitrification catalyst. Roasting was performed under conditions of a roasting temperature of 900° C., a waste catalyst particle size of 140 mesh, and a roasting time of 120 minutes. 20 wt % of a roasted product was introduced into 100 wt % of water, followed by water leaching at a leaching temperature of 50° C.

Figure 2:
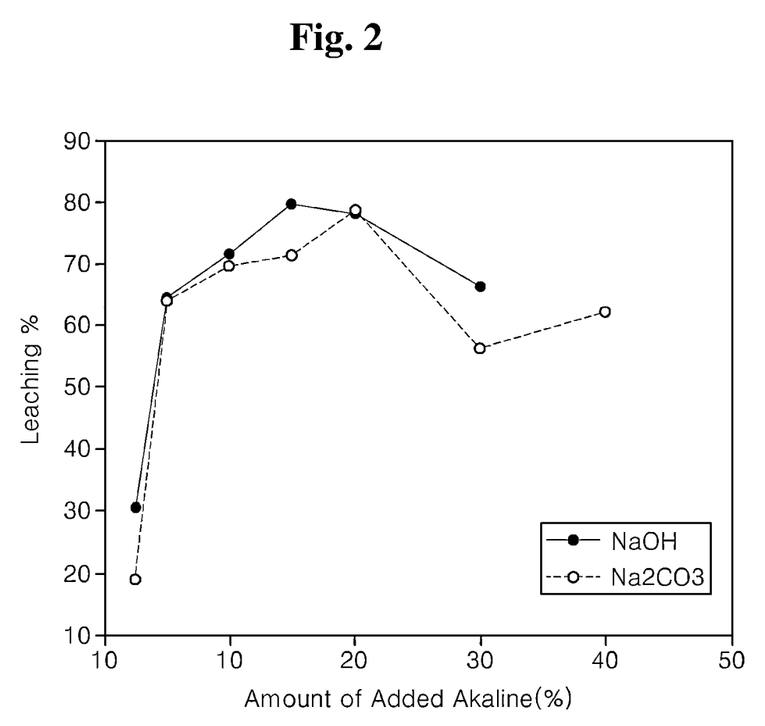
FIG. 2 is a graph depicting changes in leaching rate of vanadium as a function of the amount of an alkali metal compound.
Figure 3:
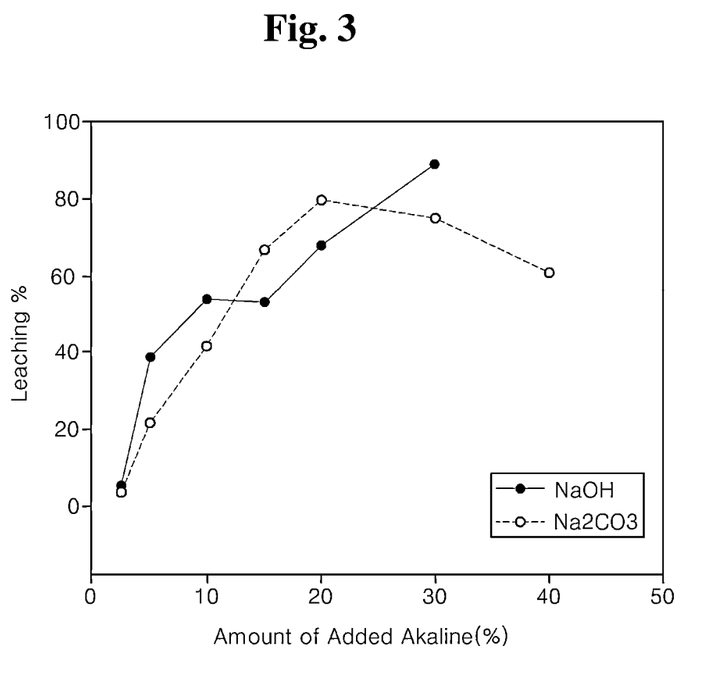
FIG. 3 is a graph depicting changes in leaching rate of tungsten as a function of the amount of an alkali metal compound.

FIG. 2 is a graph depicting changes in leaching rate of vanadium as a function of the amount of the alkali metal compound, and FIG. 3 is graph depicting changes in leaching rate of tungsten as a function of the amount of the alkali metal compound.

As shown in FIGS. 2 and 3, experimental results given varying amounts of the alkali metal compound show that leaching rates of vanadium and tungsten increase with increasing amount of the alkali metal compound. However, when NaOH was added in an amount of 40 wt % based on 100 wt % of the waste denitrification catalyst, the roasted product was excessively hardened, such that normal water leaching was impossible. This is because, such a muffle type roasting furnace cannot benefit from a stirring effect. Thus, when a rotary kiln furnace, which allows stirring, is used, it is possible to increase the amount of NaOH.

In addition, referring to FIGS. 2 and 3, it can be seen that, when the alkali metal compound is added in an amount of about 10 wt % or more based on 100 wt % of the waste denitrification catalyst, a substantially good leaching rate is obtained. Particularly, as shown in FIGS. 2 and 3, leaching rates of vanadium and tungsten are both about 50% or higher when the alkali metal compound is present in an amount of 15 wt % to 30 wt % based on 100 wt % of the waste denitrification catalyst. Within this range, the most preferable results can be obtained.

Figure 4:
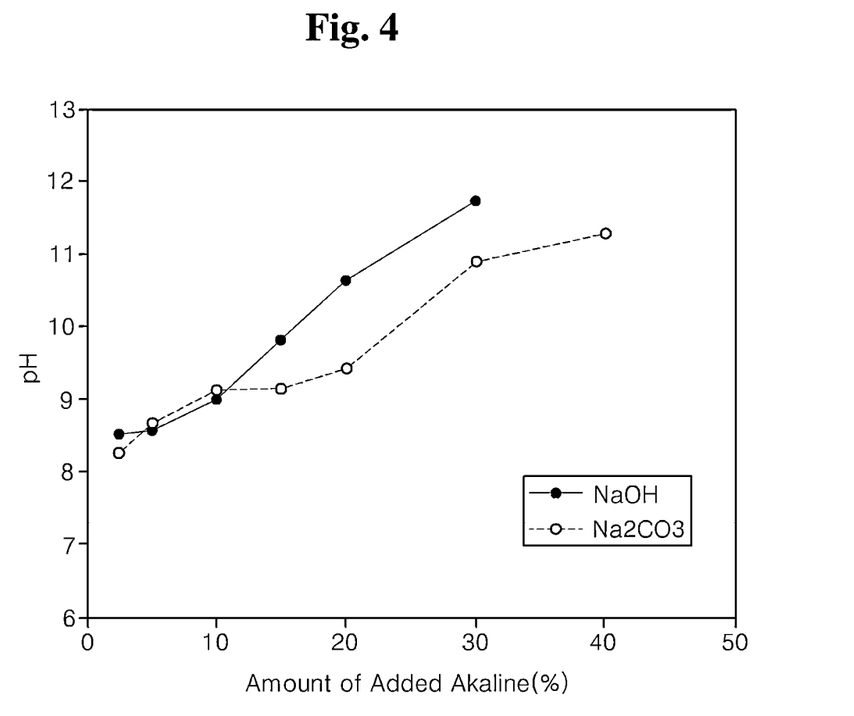
FIG. 4 is a graph depicting equilibrium pH of a leachate upon water leaching.

FIG. 4 is a graph depicting equilibrium pH of a leachate upon water leaching.

Referring to FIG. 4, it can be seen that pH increases with increasing amount of added alkali. However, this result is not proportional to the leaching rates in FIGS. 2 and 3. It is understood that increase in amount of the alkali metal compound causes the roasted product to crystallize, thereby adversely affecting water leaching while allowing increase in leaching agents.

Figure 5:
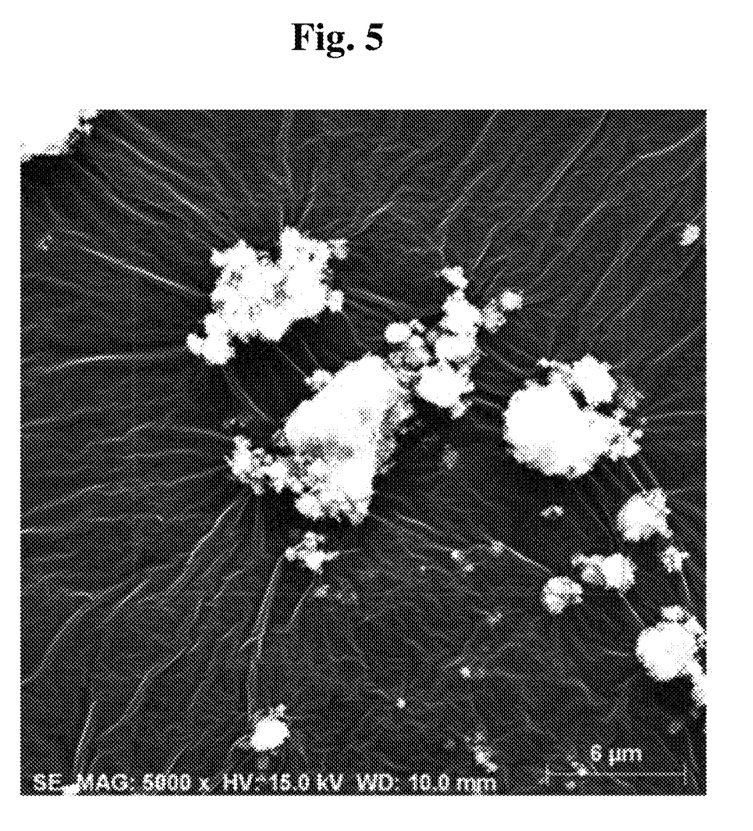
FIG. 5 shows a result of SEM analysis on a waste denitrification catalyst.
Figure 6:
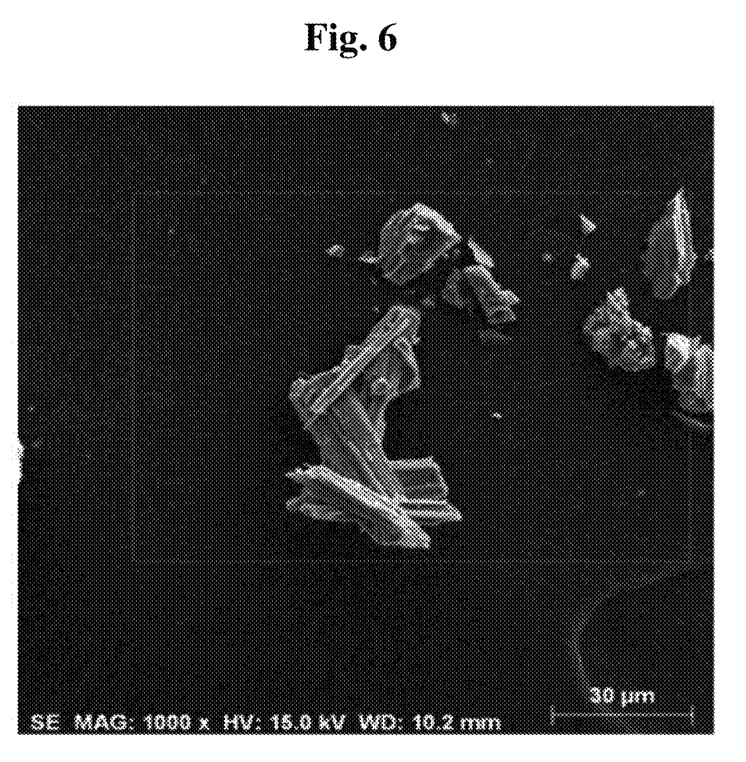
FIG. 6 shows a result of SEM analysis on a roasted product.

FIG. 5 shows a result of SEM analysis on the waste denitrification catalyst, and FIG. 6 shows a result of SEM analysis of the roasted product.

Referring to FIGS. 5 and 6, it can be seen that a product after roasting at high temperature exhibits a crystalline form (FIG. 6) which changes into a bar shape, unlike a crystalline form (FIG. 5) of an original waste denitrification catalyst sample.

This can be indirect evidence accounting for a phenomenon that an excess of the alkali metal compound causes reduction in leaching rate.

(2) Effect of Roasting Temperature

In order to identify effect of roasting temperature on leaching rate, a roasting experiment was conducted while varying the roasting temperature from 800° C. to 900° C. Roasting was performed under conditions of an amount of the alkali metal compound of 20 wt % based on 100 wt % of the waste denitrification catalyst, a waste catalyst particle size of 140 mesh, and a roasting time of 120 minutes. 20 wt % of a roasted product was introduced into 100 wt % of water, followed by water leaching at a leaching temperature of 50° C.

Figure 7:
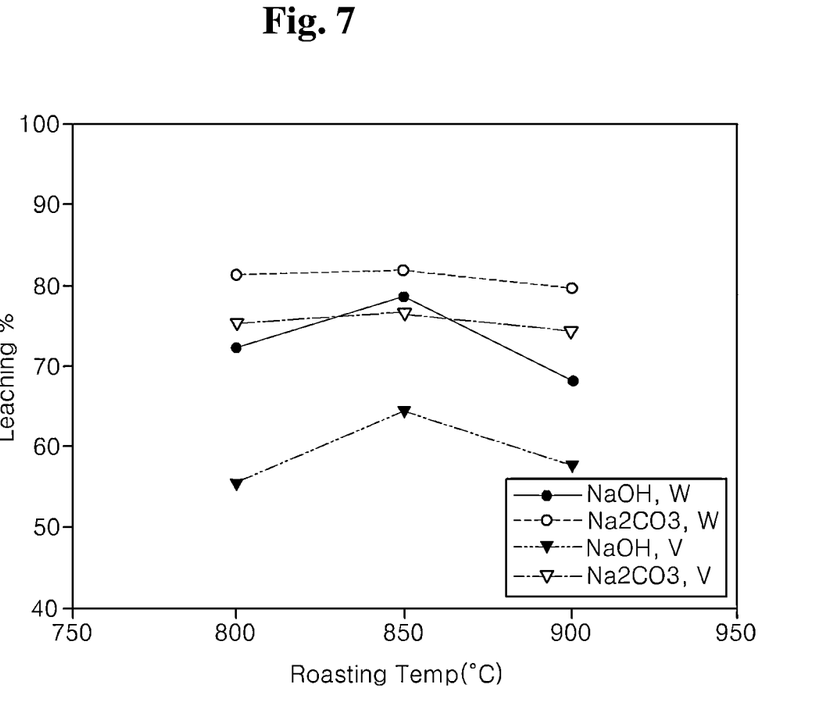
FIG. 7 is a graph depicting changes in leaching rate of vanadium and tungsten as a function of roasting temperature.

FIG. 7 is a graph depicting changes in leaching rate of vanadium and tungsten as a function of roasting temperature.

Experimental results show that, when $Na_2CO_3$ was used as the alkali metal compound, effect of roasting temperature was insignificant. However, when NaOH was used as the alkali metal compound, leaching rate had a maximum value at 850° C. After the experiment, through comparison of curing degree of roasted products, it was confirmed that products obtained by roasting a mixture containing NaOH were harder. Thus, it is understood that such properties of the roasted products affects leaching efficiency.

However, when the alkali metal compound was added in an amount of 20 wt %, leaching rate was higher than or equal to 50% at any roasting temperature within the range of 800° C. to 900° C.

(3) Effect of Particle Size of Waste Catalyst

In order to identify effect of particle size of a waste denitrification catalyst on leaching rate, a roasting experiment was conducted while varying particle size of the waste denitrification catalyst. Here, roasting was performed under conditions of an amount of the alkali metal compound of 20 wt % based on 100 wt % of the waste denitrification catalyst, a roasting temperature of 900° C., and a roasting time of 120 minutes. 20 wt % of a roasted product was introduced into 100 wt % of water, followed by water leaching at a leaching temperature of 50° C.

Figure 8:
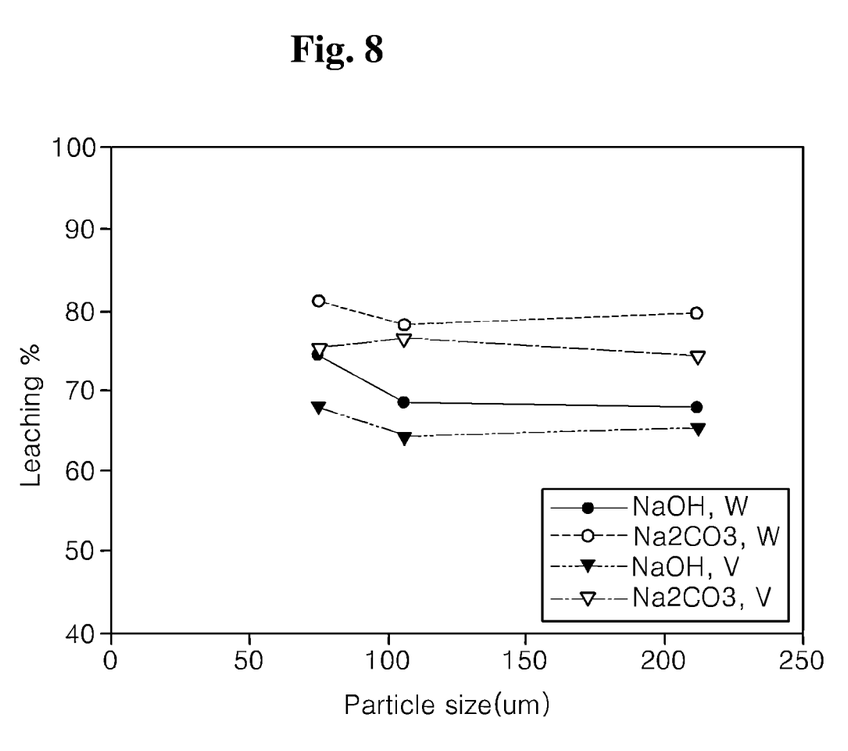
FIG. 8 is a graph depicting changes in leaching rate of vanadium and tungsten as a function of particle size of a waste denitrification catalyst.

FIG. 8 is a graph depicting changes in leaching rate of vanadium and tungsten as a function of particle size of the waste denitrification catalyst.

Referring to FIG. 8, it was confirmed that effect of particle size on leaching rate was insignificant.

On the other hand, referring to FIGS. 2 to 8, as the alkali metal compound, $Na_2CO_3$ exhibited better leaching properties than NaOH under the same conditions, and, in particular, exhibited properties advantageous to water leaching in terms of curing degree of a roasted product.

In addition, in a continuous roasting process using a rotary kiln furnace, which allows stirring, $Na_2CO_3$ is more advantageous to operation than NaOH, which is highly corrosive.

Although some embodiments have been described above with reference to the accompanying drawings, it should be understood that the present invention is not limited to these embodiments and may be embodied in different ways, and that various modifications, variations, and alterations can be made without departing from the spirit and scope of the invention. Therefore, it should be understood that the above embodiments are provided for illustration only and do not limit the scope of the present invention.

The invention claimed is:

1. A method for leaching valuable metals from a waste denitrification catalyst, comprising:
   (a) mixing a waste denitrification catalyst containing vanadium (V) and tungsten (W) in the form of oxides with an alkali metal compound in an amount of 5 wt % to 40 wt % based on 100 wt % of the waste denitrification catalyst to form a mixture;
   (b) roasting the mixture to produce a roasted product containing sodium vanadate ($NaVO_3$) and sodium tungstate ($Na_2WO_4$); and
   (c) introducing the roasted product into water to water leach sodium vanadate and sodium tungstate in the form of vanadate ions ($VO_3^-$) and tungstate ions ($WO_4^{2-}$).

2. The method according to claim 1, wherein the alkali metal compound is sodium carbonate ($Na_2CO_3$) or sodium hydroxide (NaOH).

3. The method according to claim 1, wherein step (b) is performed at 800° C. to 900° C.

4. The method according to claim 1, further comprising, after step (b), ball milling the roasted product to reduce a particle size of the roasted product.

5. The method according to claim 1, wherein, in step (c), the roasted product is introduced in an amount of 10 wt % to 30 wt % based on 100 wt % of water.

6. The method according to claim 1, wherein step (c) is performed at 40° C. to 60° C.

7. The method according to claim 1, further comprising, after step (c), filtering a leachate containing the vanadate ions and the tungstate ions.

8. A method for leaching valuable metals from a waste denitrification catalyst, comprising:
   (a) mixing a waste denitrification catalyst containing valuable metals with an alkali metal compound in an amount of 5 wt % to 40 wt % based on 100 wt % of the waste denitrification catalyst to form a mixture;
   (b) roasting the mixture to produce a roasted product; and
   (c) introducing the roasted product into water to water leach the valuable metals from the roasted product.

9. The method according to claim 8, wherein the alkali metal compound is sodium carbonate ($Na_2CO_3$) or sodium hydroxide (NaOH).

10. The method according to claim 8, wherein step (b) is performed at 800° C. to 900° C.

11. The method according to claim 8, further comprising, after step (b), ball milling the roasted product to reduce a particle size of the roasted product.

12. The method according to claim 8, wherein, in step (c), the roasted product is introduced in an amount of 10 wt % to 30 wt % based on 100 wt % of water.

13. The method according to claim 8, wherein step (c) is performed at 40° C. to 60° C.

14. The method according to claim 8, further comprising, after step (c), filtering a leachate containing vanadate ions and tungstate ions.

* * * * *